(12) United States Patent
Nakamura et al.

(10) Patent No.: US 8,493,692 B2
(45) Date of Patent: Jul. 23, 2013

(54) POSITION DETERMINING SYSTEM WITH ARM CENTER LINE CROSSING EXPANDING/CONTRACTING DIRECTION OF HINGED ACTUATOR UNIT

(75) Inventors: Shigeo Nakamura, Odawara (JP);
Yasuhiro Matsuda, Ishioka (JP);
Toshinori Sugiyama, Ninomiya (JP)

(73) Assignee: Hitachi High-Technologies Corporation, Tokyo (JP)

( * ) Notice: Subject to any disclaimer, the term of this patent is extended or adjusted under 35 U.S.C. 154(b) by 150 days.

(21) Appl. No.: 12/707,834

(22) Filed: Feb. 18, 2010

(65) Prior Publication Data

US 2010/0246044 A1 Sep. 30, 2010

(30) Foreign Application Priority Data

Mar. 25, 2009 (JP) ................................. 2009-073069

(51) Int. Cl.
*G11B 5/455* (2006.01)
*G11B 5/56* (2006.01)

(52) U.S. Cl.
USPC ...................................................... 360/294.4

(58) Field of Classification Search
USPC ........................................................ 360/294.4
See application file for complete search history.

(56) References Cited

U.S. PATENT DOCUMENTS

| 5,189,578 | A  | * | 2/1993 | Mori et al. ................. 360/294.4 |
| 6,233,124 | B1 | * | 5/2001 | Budde et al. ............... 360/294.4 |
| 6,239,953 | B1 | * | 5/2001 | Mei ............................. 360/294.4 |
| 6,498,704 | B1 | * | 12/2002 | Chessman et al. ......... 360/265.9 |
| 2002/0057517 | A1 | * | 5/2002 | Takagi et al. .............. 360/77.03 |
| 2010/0097726 | A1 | * | 4/2010 | Greminger et al. ........ 360/294.4 |
| 2010/0097727 | A1 | * | 4/2010 | Greminger ................. 360/294.4 |

FOREIGN PATENT DOCUMENTS

| JP | 2002-150519 | 5/2002 |
| JP | 2004-048955 | 2/2004 |
| JP | 3539332 | 4/2004 |
| JP | 2004-268955 | 9/2004 |
| JP | 3612670 | 11/2004 |
| JP | 2005-261167 | 9/2005 |
| JP | 2006-268955 | 10/2006 |

* cited by examiner

*Primary Examiner* — Craig A. Renner
(74) *Attorney, Agent, or Firm* — Antonelli, Terry, Stout & Kraus, LLP.

(57) ABSTRACT

A magnetic head-positioning system to accurately test a magnetic disk and a magnetic head, comprises a plurality of hinges attached on an end portion of a linear driving element and disposed on both sides of a center line of the linear driving element, which is in parallel with an extension-shrinkage direction of the linear driving element, and an arm having a length longer than a distance between a plurality of hinge joint portions, the plurality of the hinge joint portions each of which join the hinge with a root portion of the arm and which are disposed on both sides of a center line of the arm which is in parallel with a longitudinal direction of the arm. The arm has an extremity portion on which a head gimbal assembly is detachably attached and this head gimbal assembly is positioned.

25 Claims, 5 Drawing Sheets

FIG.6
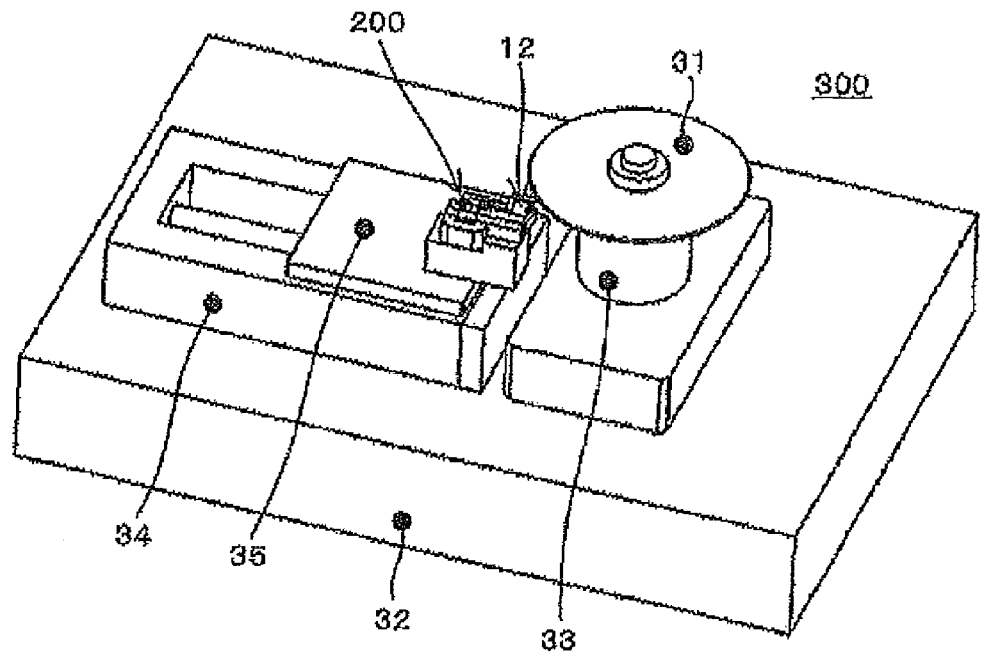
FIG. 7A
FIG. 7B
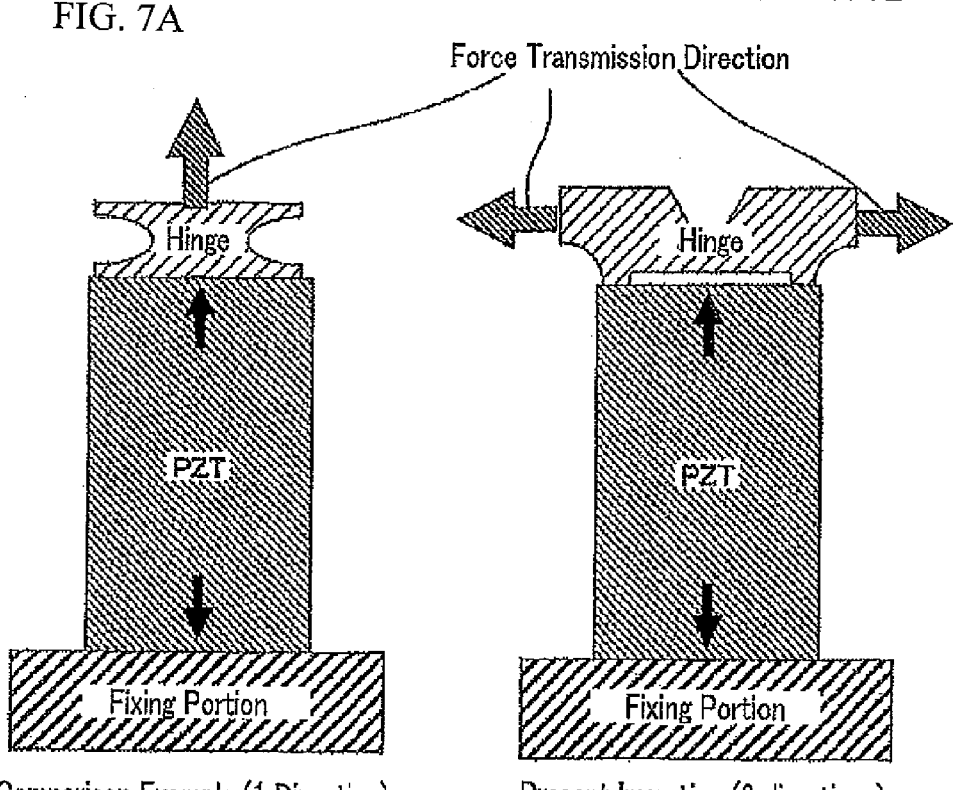
Comparison Example (1 Direction)
Present Invention (2 directions)

POSITION DETERMINING SYSTEM WITH ARM CENTER LINE CROSSING EXPANDING/CONTRACTING DIRECTION OF HINGED ACTUATOR UNIT

CLAIM OF PRIORITY

The present application claims priority from Japanese Patent Application JP2009-073069 filed on Mar. 25, 2009, the content of which is incorporated by reference into this application.

BACKGROUND OF THE INVENTION

1. Field of the Invention

The present invention relates to a magnetic head-positioning system, a magnetic head test system and a magnetic disk test system. The present invention specifically relates to a test system to have a magnetic head aligned with a target track on a magnetic disk, which is fit especially for an application in which an accurate positioning range for the magnetic head to be accurately positioned is relatively large.

2. Description of the Related Art

A magnetic head used for a magnetic head or used to store data on and reproduce the data from a magnetic disk has to be tested on its properties before it is assembled in a magnetic head system, according to Japanese Laid-open Application No. 2006-268955. The magnetic head is tested with a head gimbal assembly (referred to as "HGA" hereinafter) into which a head suspension and a magnetic head are assembled. When the magnetic head is tested, data is stored on and reproduced from a magnetic disk with the magnetic head kept floated over a magnetic disk being rotated by a spindle motor.

A piezoelectric actuator is often used for an actuator to accurately position a magnetic head. Since the piezoelectric actuator used for a fine actuator generally generates a displacement from as small as a few micron meter to 20 micron meter, it is necessary to make use of a displacement magnifying mechanism to mechanically magnify the displacement generated by the fine actuator. The principle of the displacement magnifying mechanism is a lever which is well known. According to Japanese Laid-open Application No. 2004.048955, the displacement generated by a piezoelectric actuator is magnified by a lever. According to Japanese Patent No. 3,612,670, vibration of the displacement magnifying mechanism is reduced by a damping member fitted in the displacement magnifying mechanism with which the displacement generated by a piezoelectric actuator is magnified.

According to Japanese Patent No. 3,539,332, there is another type of a displacement magnifying mechanism for an actuator which has an arm whose root portion is displaced by a couple of actuators to generate displacements and which turns as the actuators generate displacements and generates a magnified displacement at the extremity portion of the arm.

In the test system to test a magnetic head, a HGA is made to follow a target track by a fine actuator being actuated, which is fixed on a coarse actuator. The target track is not always on concentric circles about the rotation center of a magnetic disk and has a first order strain on rotation, that is, eccentricity, and a strain of higher frequency components. The eccentricity of the target track can be created by a deviation of the center of the target track which is already written on the magnetic disk from the rotation center of the spindle. This deviation results from an assemblage error caused when a magnetic disk is assembled with a spindle. The eccentricity of the target track also results from the strain caused by the written target track itself which is not a complete circle. In the case of the magnetic disk of Discrete Track Media (DTM) or Bit Pattern Media (BPM), on which the target track is written in advance, the position deviation of the center of the target track from the rotation center of the spindle is created when the magnetic disk is mounted and the eccentricity due to this deviation tends to be relatively large. If this eccentricity becomes larger, the stroke of the fine actuator to drive the HGA on which a magnetic head is mounted needs to be larger.

Furthermore, there has been a need to make the fine actuator smaller and less costly.

One of the objectives of the present invention is to provide a smaller and less costly head-positioning system which is capable of generating a larger displacement and having a better positioning accuracy.

SUMMARY OF THE INVENTION

A specific feature of the present invention is that the magnetic head-positioning system of the present invention is suited for the magnetic head test system and the magnetic disk test system and comprises a fixing portion, at least one linear driving element fitted in the fixing portion, a plurality of hinges attached on an end portion of the linear driving element and disposed on both sides of a center line of the linear driving element, the center line of the linear driving element being in parallel with an extension-shrinkage direction of the linear driving element, and an arm having an extremity portion on which a head gimbal assembly is detachably attached and a length longer than a distance between a plurality of hinge joint portions, the plurality of the hinge joint portions each of which joins the hinge with a root portion of the arm and which are disposed on both sides of a center line of the arm, the center line of the arm being in parallel with a longitudinal direction of the arm.

According to this specific feature of the present invention, such a head-positioning system as small-sized, relatively cheap, generating a relatively large displacement and having a good positioning accuracy, is provided.

Another specific feature of the present invention is that the magnetic head-positioning system of the present invention comprises a piezoelectric actuator fitted in the fixing portion, a plurality of hinges attached on an end portion of the piezoelectric actuator and disposed on both sides of a center line of the piezoelectric actuator, the center line of the piezoelectric actuator being in parallel with an extension-shrinkage direction of the piezoelectric actuator, an arm having an extremity portion on which a head gimbal assembly is detachably attached and a length longer than a distance between a plurality of hinge joint portions, the plurality of the hinge joint portions each of which joins the hinge with a root portion of the arm and which are disposed on both sides of a center line of the arm, the center line of the arm being in parallel with a longitudinal direction of the arm, and a damping material connecting the end portion of the arm with the fixing portion, wherein a HGA is positioned by rotation of the arm caused by the piezoelectric actuator elongating and shrinking.

According to this specific feature of the present invention, a magnetic head test system and a magnetic disk test system are provided, which are capable of testing a magnetic disk with a target track having large eccentricity and accurately testing a magnetic head using the magnetic disk with a target track having large eccentricity.

BRIEF DESCRIPTION OF THE DRAWINGS

FIG. 6 is a top perspective view of an actuation part of a magnetic disk test system actuation part in accordance with the third embodiment of the present invention.

FIG. 7A is an explanation figure indicating an effect of the actuation part of the comparison sample.

FIG. 7B is an explanation figure indicating an effect of the actuation part of the present invention.

DETAILED DESCRIPTION OF THE INVENTION

Hereinafter are explained embodiments of the present invention.

<First Embodiment>

Figure 1:
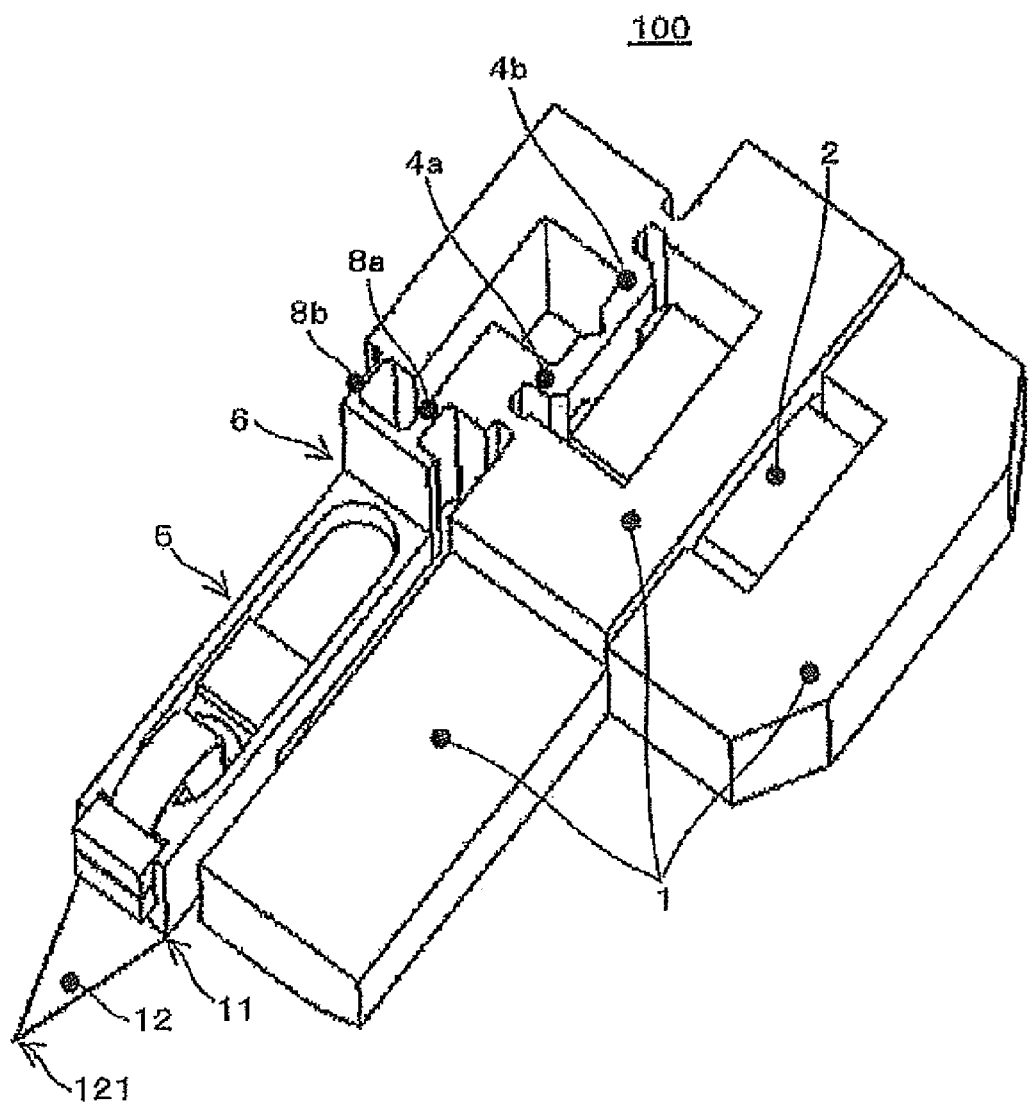
FIG. 1 is a top perspective view of a magnetic head-positioning system actuation part in accordance with the first embodiment of the present invention.
Figure 2:
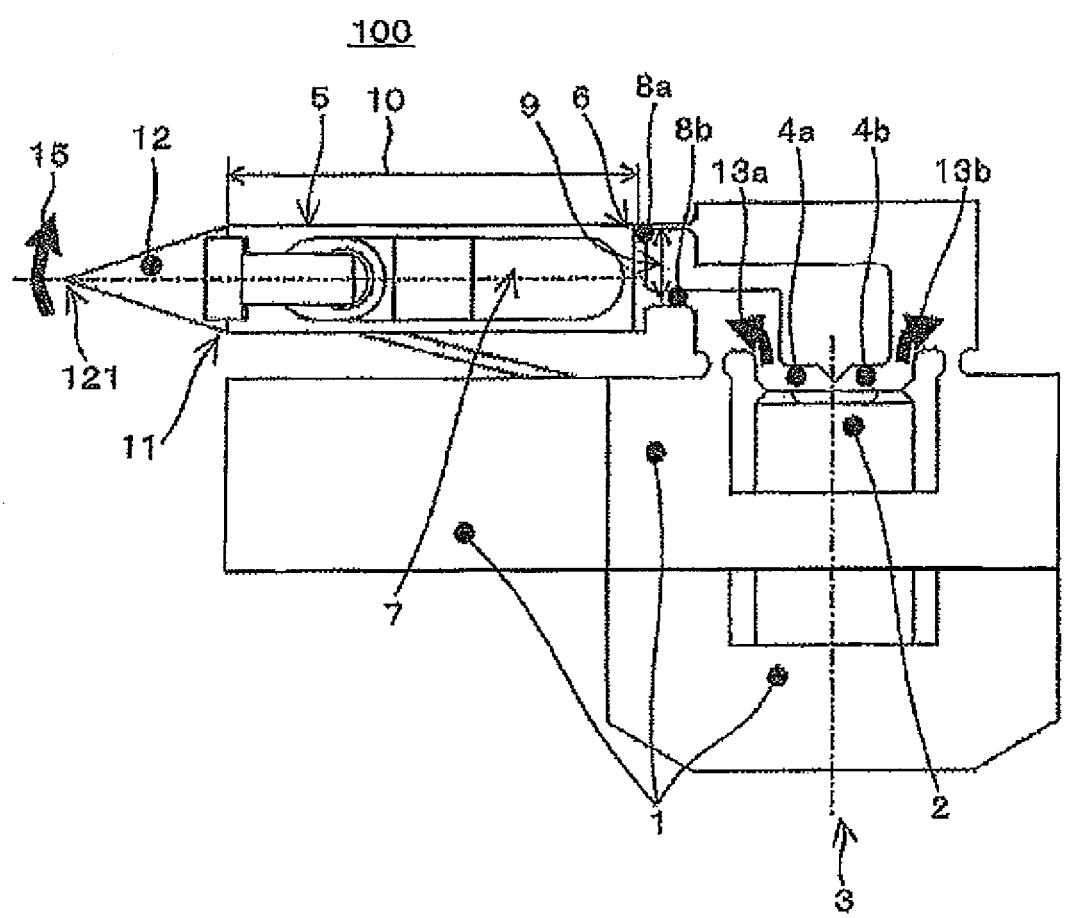
FIG. 2 is an explanation figure illustrating the operation of the magnetic head-positioning system actuation part shown in FIG. 1.

FIG. 1 is a top perspective view of a magnetic head-positioning system actuation part 100 in accordance with the first embodiment of the present invention. FIG. 2 is an explanation figure illustrating the operation of the magnetic head-positioning system actuation part 100 shown in FIG. 1.

As is shown in FIG. 1 and FIG. 2, the magnetic head-positioning system actuation part 100 comprises a piezoactuator 2 fitted in a fixing portion 1, hinges 4a, 4b, an arm 5 and hinge joint portions 8a, 8b. The hinges 4a, 4b are disposed over the end portion of the piezoactuator 2 and one of the hinges 4a, 4b is on the right side of the center line 3 of the piezoactuator 2 in parallel with the extension-shrinkage direction of the piezoactuator 2 with the other of the hinges 4a, 4b disposed on the left side. The hinges 4a, 4b are connected with a root portion 6 of the arm 5 through the hinge joint portions 8a, 8b respectively. The hinge joint portions 8a, 8b are disposed on the root portion 6 and one of the hinge joint portions 8a, 8b is disposed on the right side of the center line 7 of the arm 5 in its longitudinal direction with the other on the left side. An arm length 10 is much longer than a distance 9 between the hinge joint portions 8a, 8b. The arm 5 has a HGA 12 detachably fixed on the end portion 11.

As indicated in FIG. 2, if the piezoactuator 2 elongates, the hinges 4a, 4b are displaced so as to open as indicated by arrows 13a, 13b in FIG. 2 and the hinge joint portion 8a is strained while the hinge joint portion 8b is being compressed because both of the hinges 4a, 4b which are displaced and opened are connected with the root portion 6 of the arm 5. As a result, the arm 5 and the HGA 12 fixed on the arm 5 rotate as indicated by an arrow 15.

The reason why the piezoelectric actuator 2 constituted by piezoelectric elements is used for the actuator to press the hinges 4a, 4b in the magnetic head-positioning system actuation part 100 is that features of piezoelectric elements are suited for the actuator for positioning. The piezoelectric element has such features as a generating force being large while the size is small, high displacement resolution, lower energy consumption than the electromagnetic type actuator and no magnetic flux leakage because of no need for magnetic field.

In this embodiment, if the arm length 10 is set much longer than the distance 9 between the hinge joint portions 8a, 8b, the movable distance of the HGA 12 at the extremity portion 121 becomes large as compared with the displacement generated on the piezoelectric actuator 2. Since both the arm length 10 and the distance 9 between the hinge joint portions 8a, 8b are determined regardless of the size of the piezoelectric actuator 2, it is possible to make the movable distance of the extremity portion 121 of the HGA 12 larger up to a limit beyond which vibration is too large to be allowed without being restricted by the size of the piezoelectric actuator 2.

Moreover the center line 3 of the piezoelectric actuator 2 in its extension-shrinkage direction is set perpendicular to the center line 7 of the arm 5 in its longitudinal direction in this embodiment. As a result the generating force of the piezoelectric actuator 2 is efficiently transmitted.

In the magnetic head-positioning actuation part 100 in which the arm 5 is rotated by applying a force to the root portion 6 of the arm 5, it is possible to rotate the arm 5 by using a fulcrum point and an application point on force. On the other hand the arm 5 is rotated without any fulcrum point by applying a couple of different forces applied to the root portion 6 in this embodiment. Therefore it is possible to avoid a problem with stress concentration at a fulcrum point and instability of operation attributed to a position deviation between the rotation center of the arm 5 and the fulcrum point.

In the present embodiment, there is no need to make use of a couple of actuators in order to apply a couple of different forces on the root portion 5, although it is possible to apply a couple of different forces on the root portion 5 by making use of only one piezoelectric actuator 2. Obviously this embodiment makes it possible to have a less costly and smaller magnetic head-positioning system than an actuation structure making use of a couple of actuators.

Next an explanation is given on functions, effects and an operation principle of the present invention. FIG. 7A is an explanation figure indicating an effect of the actuation part of the comparison sample. FIG. 7B is an explanation figure indicating an effect of the actuation part of the present invention. In the case of the comparison sample, the force (indicated by small arrows in FIG. 7A) generated by a piezoelectric actuator is applied to the fixing portion and a hinge and is transmitted in only a direction (indicated by a large arrow) through the hinge. On the other hand, in the case of an actuator structure of the present invention, the force (indicated by small arrows in FIG. 7B) which is generated from a piezoelectric actuator is transmitted and applied to the fixing portion and a hinge, and transmitted in two different directions (indicated by large arrows in FIG. 7B) through the hinge. There are a couple of excellent effects attributed to this actuator structure.

(1) Magnification rate of device's displacement to actuator's displacement becomes larger with a displacement difference being magnified.

(2) Actuator's generating force being divided in two directions corresponds to a couple of hinges being integrally formed. As a result, property variation of the displacement magnification section which is attributed to a hinge dimension error is made smaller (the total property variation of the displacement magnification section due to production errors corresponds to the average on the plurality of the hinge dimension errors).

<Second Embodiment>

Figure 3:
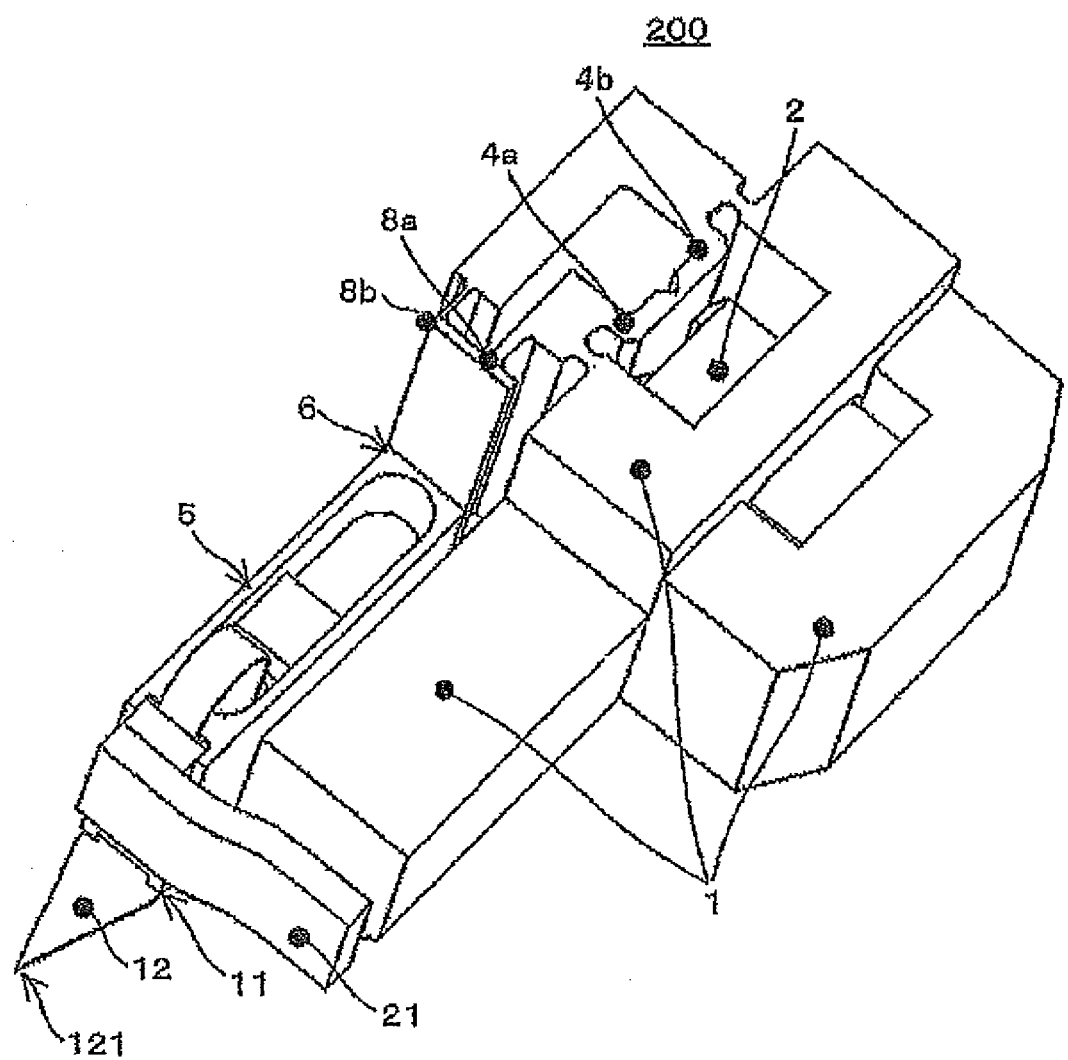
FIG. 3 is an explanation figure of a magnetic head-positioning system actuation part in accordance with the second embodiment of the present invention.

FIG. 3 is a top perspective view of a magnetic head-positioning system actuation part 200 in accordance with the second embodiment of the present invention. Is The magnetic head-positioning system actuation part 200 comprises a piezoactuator 2 fitted in a fixing portion 1, hinges 4a, 4b, an arm 5 and a damping rubber 21. The hinges 4a, 4b are disposed over the end portion of the piezoactuator 2 and one of the hinges 4a, 4b is on the right side of the center line 3 of the piezoactuator 2 in parallel with the extension-shrinkage direction of the piezoactuator 2 with the other of the hinges 4a, 4b disposed on the left side. The hinges 4a, 4b are connected with a root portion 6 of the arm 5 through the hinge joint portions 8a, 8b respectively. The hinge joint portions 8a, 8b are disposed on the root portion 6 and an arm length 10 is much longer than a distance 9 between the hinge joint portions 8a, 8b. The arm 5 has a HGA 12 detachably fixed on the end portion 11 and a damping rubber which is jointed with both the end portion 11 of the arm 5 and the fixing portion 1 and connects them. The magnetic head-positioning system actuation part 100 of the first embodiment and the damping rubber 21 connecting the end portion 11 constitute the magnetic head-positioning system actuation part 200 of this embodiment.

The magnetic head-positioning system actuation part 200 operates the same way as the magnetic head-positioning system actuation part 100 of the first embodiment does.

Figure 4:
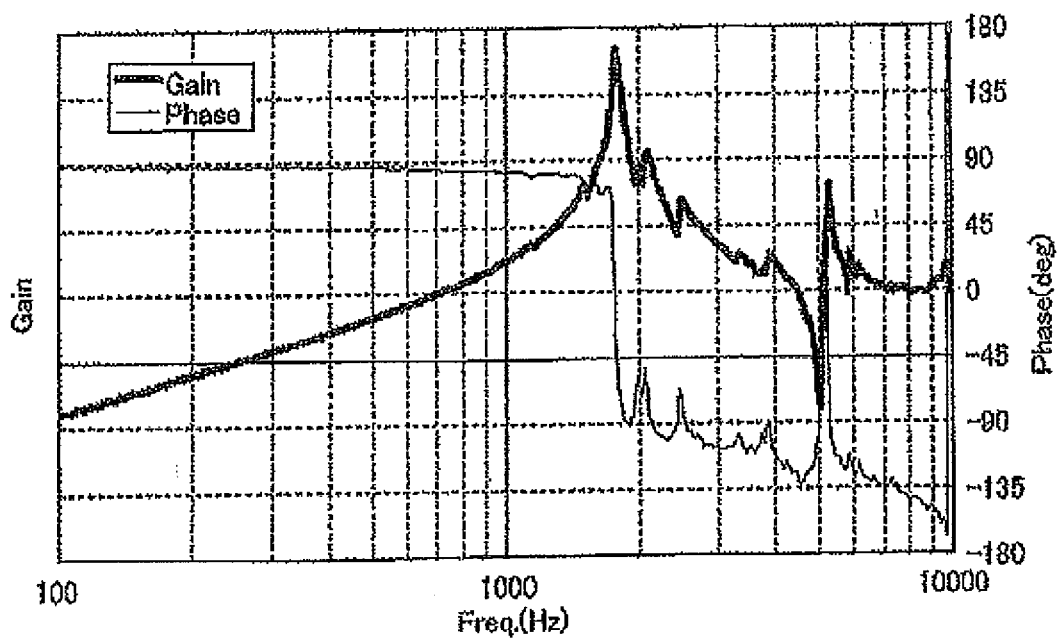
FIG. 4 indicates the frequency response of the magnetic head-positioning system shown in FIG. 1.
Figure 5:
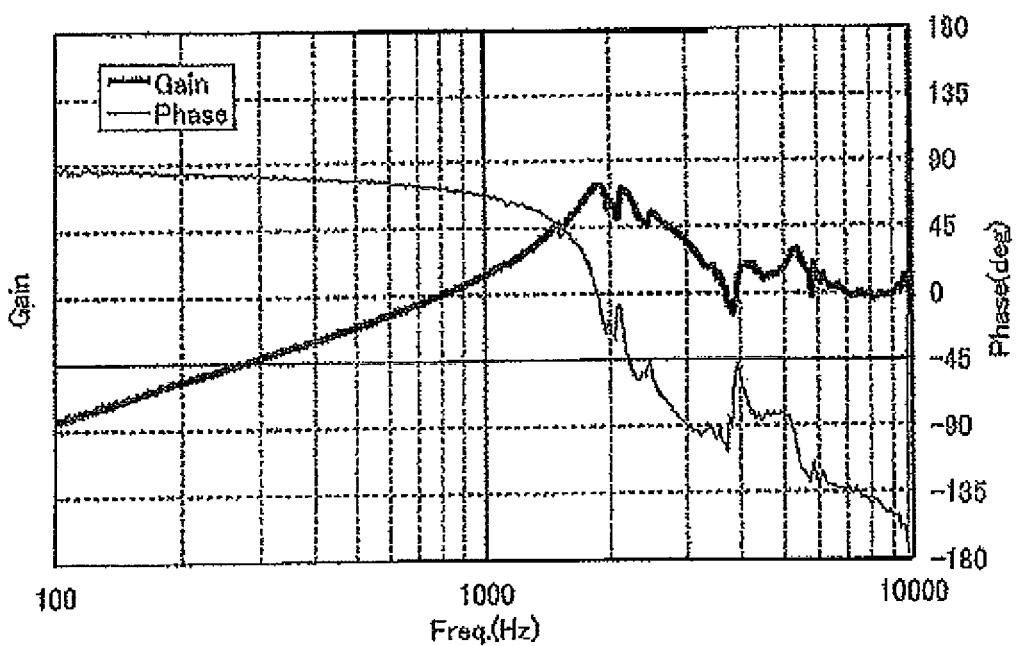
FIG. 5 indicates the frequency response of the magnetic head-positioning system shown in FIG. 3.

FIG. 4 indicates the frequency-vibration response of the magnetic head-positioning system actuation part 100 shown in FIG. 1 while FIG. 5 indicates the frequency-vibration response of the magnetic head-positioning system actuation part 200 shown in FIG. 3. Each figure indicates vibration of the extremity portion 121 of the HGA 12 in response to the input voltage to the piezoactuator 2. There are a couple of relatively large vibration modes at the frequency a little smaller than 2 kHz and around the frequency of 5 kHz as seen from FIG. 4. However gains of these relatively large vibration modes decrease significantly in FIG. 5. Accordingly more accurate positioning is possible with the magnetic head-positioning system actuation part 200 of this embodiment.

<Third Embodiment>

FIG. 6 indicates the third embodiment of the present invention and is a top perspective view of a magnetic disk test system actuation part in accordance with the third embodiment of the present invention, which utilizes the magnetic head-positioning system actuation part 200.

The magnetic disk test system is a system which reproduces both magnetic information magnetically written on a magnetic disk 31 in advance and magnetic information magnetically written on the magnetic disk 31 with a magnetic head attached on the extremity portion 121 of the HGA 12 and tests the magnetic disk property.

The magnetic disk test system actuation part 300 comprises the magnetic disk 31, a base plate 32, a spindle 33, a coarse actuator 34 and a magnetic head-positioning system actuation part 200 of the second embodiment. The coarse actuator 34 and the spindle 33 are fixed on the base plate 32. The magnetic disk 31 is rotatably and detachably attached on the spindle 33. The magnetic head-positioning system actuation part 200 is fixed on a coarse positioning table 35 of the coarse actuator 34.

Although the magnetic head-positioning system actuation part 200 is capable of enlarging a traveling distance of the extremity portion 121 of the HGA 12, it is difficult for the magnetic head-positioning system actuation part 200 to have the extremity portion 121 cover a whole information written area of the magnetic disk whose diameter length is as long as a few tens of millimeters. Therefore the HGA 12 is positioned with the magnetic head-positioning system actuation part 200 after the magnetic head-positioning system actuation part 200 is coarsely positioned at a predetermined position. According to this positioning method, it is possible to position accurately the magnetic head attached on the extremity portion 121 of the HGA 12 at any specific point in the entire information written area of the magnetic disk and the magnetic disk is to be tested accurately.

As has been explained, the HGA 12 is positioned on the magnetic disk 31 with the coarse actuator 34 and the magnetic head-positioning system actuation part 200 in this embodiment. However, there may be a third actuator attached between the coarse actuator 34 and the magnetic head-positioning system actuation part 200. The magnetic head test system having the three actuators has an effect of increasing freedom for positioning control and positioning function in addition to the effect of this embodiment.

<Fourth Embodiment>

The fourth embodiment of the present invention is intended for a magnetic head test system utilizing a magnetic head-positioning system actuation part described in the third embodiment. Accordingly the magnetic head-positioning system actuation part consists of constituents as described in FIG. 3 and the magnetic head test actuation part includes constituents described in FIG. 6. The magnetic head test system is a system which reproduces both magnetic information magnetically written on a magnetic disk in advance and magnetic information magnetically written on the magnetic disk 31 with a magnetic head attached on the extremity portion 121 of the HGA 12 and tests the property of the HGA 12.

With this structure as explained, the magnetic head test system of the fourth embodiment is capable of positioning accurately the magnetic head attached on the extremity portion 121 of the HGA 12 in the entire information written area of the magnetic disk 31 and testing accurately the HGA 12.

As is the case with the third embodiment, the HGA 12 is positioned on the magnetic disk 31 with the coarse actuator 34 and the magnetic head-positioning system actuation part 200 in this embodiment. However, there may be a third actuator attached between the coarse actuator 34 and the magnetic head-positioning system actuation part 200. The magnetic head test system having the three actuators has an effect of increasing freedom for positioning control and positioning function in addition to the effect of this embodiment.

Although embodiments of the present invention have been described, the present invention should not be limited to what has been described. There are other various embodiments within the scope of the present invention.

The embodiments described above indicate that the present invention is applied to a magnetic disk test system. However it is also possible to apply the present invention to other systems such as a magnetic head-positioning control system, a magnetic head test system and a system to evaluate both a magnetic disk and a magnetic head.

What is claimed:

1. A system for determining a position comprising:
    an actuator unit;
    an arm; a first hinge which connects a right side of said actuator unit with a right side of said arm;
    a second hinge which connects a left side of said actuator unit with a left side of said arm;
    a head gimbal assembly connected with said arm,
    wherein a connecting line which connects a first connecting point between said first hinge and said actuator unit with a second connecting point between said second hinge and said actuator unit is substantially perpendicular to a direction in which said actuator unit expands and contracts,
    wherein a center line of said arm is substantially perpendicular to said direction in which said actuator unit expands and contracts, and
    wherein said arm extends substantially in parallel with said connecting line.

2. The system for determining a position according to claim 1, wherein the first hinge connects a right side edge of said actuator unit with a right side edge of said arm, and the second hinge connects a left side of said actuator unit with a left side edge of said arm.

3. The system for determining a position according to claim 1, further comprising:

a plate;

wherein a side of said actuator unit that is an opposite side to a side that said first hinge and said second hinge are connected with said actuator unit is connected with said plate.

4. The system for determining a position according to claim 3, wherein said first hinge is connected with said plate, and said second hinge is connected with said plate.

5. The system for determining a position according to claim 4, wherein said first hinge is connected with said plate outside of a position that said first hinge is connected with said actuator unit, and said second hinge is connected with said plate outside of a position that said second hinge is connected with said actuator unit.

6. The system for determining a position according to claim 4, further comprising an elastic body which connects an apex of said arm with said plate.

7. The system for determining a position according to claim 1, wherein said first hinge and said second hinge are thicker than said arm.

8. The system for determining a position according to claim 1, wherein said actuator unit comprises a piezo actuator.

9. The system for determining a position according to claim 1, wherein said arm is longer than a distance between a position that said first hinge is connected with said arm and a position that said second hinge is connected with said arm.

10. The system according to claim 1, wherein the head gimbal assembly includes a magnetic head.

11. The system according to claim 1, wherein said head gimbal assembly is connected to an extremity portion of said arm.

12. The system according to claim 11, wherein the head gimbal assembly includes a magnetic head.

13. The system according to claim 11, wherein said head gimbal assembly is detachably attached to said extremity portion of said arm.

14. The system according to claim 13, wherein the head gimbal assembly includes a magnetic head.

15. A system for acquiring magnetic information from a magnetic material comprising:

a mounting system which mounts said magnetic material;

a moving system comprising:

an actuator unit;

an arm; a first hinge which connects a right side of said actuator unit with a right side of said arm;

a second hinge which connects a left side of said actuator unit with a left side of said arm; and a head gimbal assembly which is arranged at an apex of said arm, wherein a connecting line which connects a first connecting point between said first hinge and said actuator unit with a second connecting point between said second hinge and said actuator unit is substantially perpendicular to a direction in which said actuator unit expands and contracts, wherein a center line of said arm is substantially perpendicular to said direction in which said actuator unit expands and contracts, and wherein said arm extends substantially in parallel with said connecting line.

16. The system for acquiring magnetic information from a magnetic material according to claim 15;

wherein the first hinge connects a right side edge of said actuator unit with a right side edge of said arm, and the second hinge connects a left side of said actuator unit with a left side edge of said arm.

17. The system for acquiring magnetic information from a magnetic material according to claim 15 further comprising:

a plate;

wherein a side of said actuator unit that is an opposite side to a side that said first hinge and said second hinge are connected with said actuator unit is connected with said plate.

18. The system for acquiring magnetic information from a magnetic material according to claim 17, wherein said first hinge is connected with said plate, and said second hinge is connected with said plate.

19. The system for acquiring magnetic information from a magnetic material according to claim 18, wherein said first hinge is connected with said plate outside of a position that said first hinge is connected with said actuator unit, and said second hinge is connected with said plate outside of a position that said second hinge is connected with said actuator unit.

20. The system for acquiring magnetic information from a magnetic material according to claim 17, further comprising:

an elastic body which connects an apex of said arm with said plate.

21. The system for acquiring magnetic information from a magnetic material according to claim 15, wherein said first hinge and said second hinge are thicker than said arm.

22. The system for acquiring magnetic information from a magnetic material according to claim 15, wherein said actuator unit is comprised of a piezo actuator.

23. The system for acquiring magnetic information from a magnetic material according to claim 15, wherein said arm is longer than a distance between a position that said first hinge is connected with said arm and a position that said second hinge is connected with said arm.

24. The system according to claim 15, wherein said head gimbal assembly is detachably attached to said apex of said arm.

25. The system according to claim 15, wherein the head gimbal assembly includes a magnetic head.

* * * * *